US008270609B2

(12) United States Patent
Ma

(10) Patent No.: US 8,270,609 B2
(45) Date of Patent: Sep. 18, 2012

(54) MECHANISM FOR SECURE TRANSMISSION OF SIGNALS IN WIRELESS COMMUNICATION DEVICES

(75) Inventor: Kenneth Ma, Cupertino, CA (US)

(73) Assignee: Broadcom Corporation ( * ) Notice: Subject to any disclaimer, the term of this patent is extended or adjusted under 35 U.S.C. 154(b) by 2734 days.

(21) Appl. No.: 10/461,012

(22) Filed: Jun. 13, 2003

(65) Prior Publication Data

US 2004/0252838 A1    Dec. 16, 2004

(51) Int. Cl.
H04L 29/06    (2006.01)
(52) U.S. Cl. .......................... 380/270; 713/150
(58) Field of Classification Search .......... None
See application file for complete search history.

(56) References Cited

U.S. PATENT DOCUMENTS

| | | | |
|---|---|---|---|
| 5,007,518 A | 4/1991 | Crooks et al. | |
| 5,351,293 A | 9/1994 | Michener et al. | |
| 5,583,933 A | 12/1996 | Mark | |
| 6,097,817 A * | 8/2000 | Bilgic et al. | 380/270 |
| 6,141,564 A * | 10/2000 | Bruner et al. | 455/558 |
| 6,230,002 B1 * | 5/2001 | Floden et al. | 455/411 |
| 6,289,460 B1 * | 9/2001 | Hajmiragha | 726/28 |
| 6,377,825 B1 | 4/2002 | Kennedy et al. | |
| 6,430,407 B1 * | 8/2002 | Turtiainen | 455/411 |
| 6,466,804 B1 * | 10/2002 | Pecen et al. | 455/558 |
| 2002/0169958 A1 * | 11/2002 | Nyman et al. | 713/168 |
| 2002/0169966 A1 * | 11/2002 | Nyman et al. | 713/182 |
| 2003/0041244 A1 * | 2/2003 | Buttyan et al. | 713/172 |
| 2004/0059951 A1 * | 3/2004 | Pinkas et al. | 713/202 |
| 2004/0180657 A1 * | 9/2004 | Yaqub et al. | 455/435.1 |

FOREIGN PATENT DOCUMENTS

| | | |
|---|---|---|
| WO | WO-01/95605 A | 12/2001 |
| WO | WO0221867 | 3/2002 |
| WO | WO-02/089449 A | 11/2002 |

OTHER PUBLICATIONS

M. Mouly, et al., "GSM System for Mobile Communications", Europe Media, 1993, pp. 432-498.*
Anderson, Ross, Security Engineering: A Guide to Building Dependable Distributed Systems, 2001, John Wiley and Sons, pp. 35-50, 353-358.*
Holger Krummel, SIM Access Profile Interoperability Specification, Jun. 6, 2002, 50 pages, Rev. 0.95 VDc, Bluetooth SIG., USA.
EPO Communication dated Feb. 18, 2011 in Application No. 04009901.2-1525/1487225.

* cited by examiner

Primary Examiner — Matthew Smithers
Assistant Examiner — Jeffery Williams
(74) Attorney, Agent, or Firm — Brinks Hofer Gilson & Lione

(57) ABSTRACT

One or more systems and methods are disclosed to provide secure transmission of signals by a primary wireless communication device that utilizes a secure multi-tier signal encryption mechanism. A secondary signal encryption mechanism of a secondary wireless communication device generates an intermediary algorithmic output required in the encryption processing at a primary signal encryption mechanism of a primary wireless communication device. In one embodiment, the secondary signal encryption mechanism comprises a subscriber identity module (SIM) card. In one embodiment, wireless signal transmission occurs over a GSM/GPRS/EDGE network.

47 Claims, 5 Drawing Sheets

MECHANISM FOR SECURE TRANSMISSION OF SIGNALS IN WIRELESS COMMUNICATION DEVICES

RELATED APPLICATIONS

This application is related to U.S. application Ser. No. 10/460,969 entitled "Authentication Mechanism for Wireless Communication Devices" filed on Jun. 13, 2003, which application is incorporated herein by reference herein in its entirety.

INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Today, millions of people around the world use wireless communications devices such as wireless telephones. Wireless phones are not just used for voice communications anymore. These days, wireless devices provide an incredible array of functions, and new technologies are continuously applied to provide feature and function rich devices at an incredible pace. Wireless devices store contact information, generate task lists, schedule appointments and set reminders, provide a built-in calculator, send or receive e-mail, access information such as news, entertainment, stock quotes from the Internet, play simple games, and may incorporate other devices such as PDAs, PCs, and GPS receivers.

Wireless communications devices are being turned into powerful communications tools that allow easy access to a host of mission critical corporate information. Lawyers may access information to construct a winning argument for an in-session court case. Real estate agents may communicate time critical information to their clients on the road as a new residential listing becomes available on the market. Officers in the public safety sector, may access criminal information related to the pursuit of a suspect. Fleet service corporations may track the progress of their services by monitoring the locations of their vehicles. In general, professionals in many vertical markets use wireless voice and data communications as a significant business tool.

Of the different mobile communications systems in the world, Global System for Mobile Communications (GSM) accounts for a majority of the world's digital mobile phones. One of its key strengths is its international roaming capability, giving consumers service in many different countries. In a GSM network, a subscriber identity module (SIM) card is inserted into a GSM phone to identify a subscriber and provide keys and ciphering algorithms required to encrypt the voice and data transmitted from a GSM phone. A SIM card has a memory and a processor enabling it to process algorithms used in the signal encryption process. Unfortunately, there are drawbacks of using such SIM cards. Each wireless communication device must have a SIM card in order for it to operate. Often, a subscriber will need multiple SIM cards to operate all his devices.

As a result of this requirement, a subscriber will often have multiple billing accounts associated with each SIM card. The subscriber may be required to manage a number of billing statements associated with each SIM card. Further, the process of obtaining a new SIM card may be time consuming.

Another issue relates to the inability of consolidating airtime usage of multiple devices into a single account. The use of separate accounts results in airtime rates that are collectively higher than that obtained when a single plan is used to cover usage of all devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system and method to provide secure transmission of signals by a wireless communication device that utilizes a multi-tier signal encryption mechanism. By applying the multi-tier signal encryption mechanism to multiple wireless communication devices, a number of benefits may be provided to a subscriber of wireless services.

In one embodiment, the system comprises a primary wireless communication device and a secondary wireless communication device communicating over an air interface. Additionally, the system comprises the primary wireless communication device communicating to a base transceiver station over a wide area air interface. A secondary signal encryption mechanism in the secondary wireless communication device provides keys and ciphering algorithms required for processing of algorithms at a primary signal encryption mechanism in the primary wireless communication device.

In one embodiment, the system comprises a primary wireless communication device such as an exemplary personal digital assistant (PDA) communicating with a secondary wireless communication device such as an exemplary smart phone. Additionally, the system comprises the PDA communicating to a base transceiver station by way of an exemplary GSM/GPRS/EDGE air interface. A subscriber identity module (SIM) card in the smart phone provides necessary keys and ciphering algorithms required for processing of algorithms at the PDA.

In one embodiment, a method of implementing a multi-tier signal encryption process is provided. The multi-tier encryption process comprises encrypting a wireless signal using a primary signal encryption mechanism of a primary wireless communication device by incorporating outputs provided by a secondary signal encryption mechanism of a secondary wireless communication device.

In one embodiment, a method of implementing a multi-tier encryption process is provided for a GSM/GPRS/EDGE wireless network. The multi-tier encryption process comprises encrypting a wireless signal using an A5 GSM algorithm of a PDA by incorporating outputs generated by an A8 GSM algorithm provided by a SIM card of a smart phone.

These and other advantages, aspects, and novel features of the present invention, as well as details of illustrated embodiments, thereof, will be more fully understood from the following description and drawings.

DETAILED DESCRIPTION OF THE INVENTION

Figure 1:
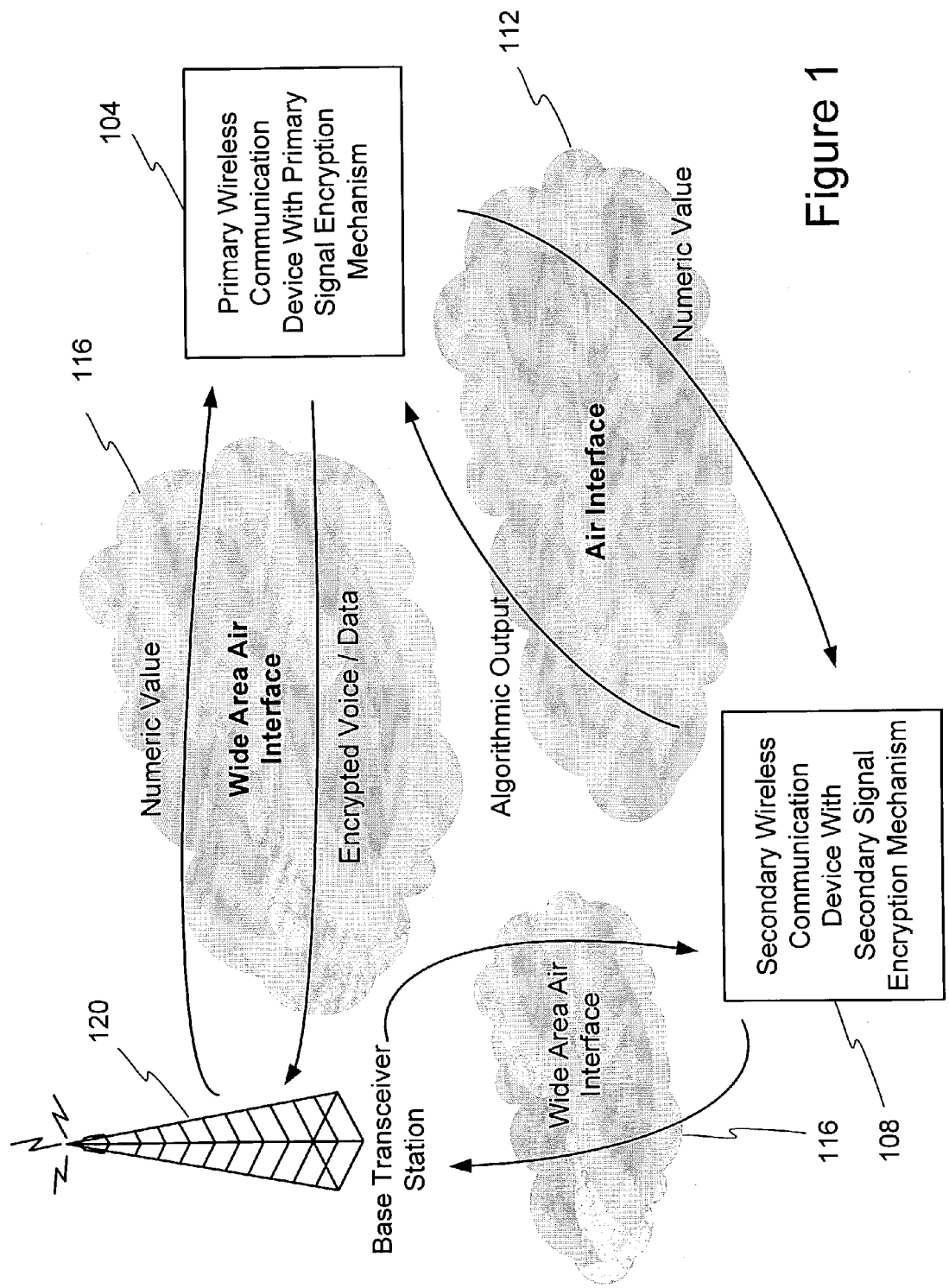
FIG. 1 is a block diagram of a system illustrating a multi-tier signal encryption mechanism in accordance with an embodiment of the invention.

Aspects of the present invention may be found in a system and method to securely transmit or receive a signal generated by a wireless communication device by way of a multi-tier signal encryption mechanism. The multi-tier signal encryption mechanism obtains necessary keys and algorithms used in the signal encryption process from a combination of a primary signal encryption mechanism provided by a primary wireless communication device and a secondary signal encryption mechanism provided by a secondary wireless communication device. The signal to be encrypted may comprise a baseband communication signal such as voice, data, and signaling information transmitted by a wireless communication device. The primary wireless communication device encrypts the baseband signal using the primary signal encryption mechanism to subsequently transmit the encrypted signal to a wireless carrier. The secondary signal encryption mechanism of the secondary wireless communication device generates an intermediary output that is incorporated by the primary signal encryption mechanism of the primary wireless communication device in encrypting the baseband signal.

The multi-tier signal encryption mechanism comprises primary and secondary signal encryption mechanisms located, respectively, within their primary and secondary wireless communication devices. The multi-tier encryption process comprises the acquisition and incorporation by the primary signal encryption mechanism of the primary wireless communication device of an output generated by ciphering algorithms (operating on one or more secure keys) provided by the secondary signal encryption mechanism of the secondary wireless communication device. The one or more secure keys may be provided by secure transmission from a wireless carrier and/or may be securely encoded within hardware of the secondary signal encryption mechanism of the secondary wireless communication device. The output may be transmitted from the secondary wireless communication device by way of an alternate secured air interface. The primary wireless communication device incorporates the output transmitted by the secondary wireless communication device to securely encrypt signals (such as voice and data) prior to their transmission to a carrier over an air interface. The primary signal encryption mechanism of the primary wireless communication device may utilize one or more ciphering algorithms to operate on the output provided by the secondary wireless communication device. The output generated by the secondary signal encryption mechanism of the secondary wireless communication device may comprise a numeric value. It is contemplated the additional algorithmic ciphering performed by the primary signal encryption mechanism provides for improved security prior to signal transmission to a carrier's base transceiver station.

In order to decrypt encrypted signals, the one or more keys and ciphering algorithms provided by the multi-tier signal encryption mechanism may be stored at a carrier's authentication center or distributed at one or more points within a carrier's network. Once a carrier receives an encrypted signal, the signal may be decrypted at any suitable point within the carrier's network. In some instances, the signal may be decrypted at another wireless communication device (or mobile station). It is contemplated the authentication center contains a protected database that stores all keys and ciphering algorithms for all signal encryption mechanisms that utilize the services of the carrier.

The secondary signal encryption mechanism and its corresponding secondary wireless communication device provides algorithmic processing of one or more keys stored within the secondary signal encryption mechanism. As an added security measure, in one embodiment, the secondary signal encryption mechanism may incorporate a secure key transmitted by a carrier into one or more of its ciphering algorithms. The secure key may be a numeric value such as a random number that may be generated from a carrier's authentication center. The secure key may be transmitted to the secondary signal encryption mechanism contained within a secondary wireless communication device by way of a primary signal encryption mechanism contained within a primary wireless communication device.

It is contemplated that the one or more keys of the secondary signal encryption mechanism are encoded in hardware and/or software. The secondary signal encryption mechanism comprises a portable and removable hardware and/or software that is capable of being inserted into one or more wireless communication devices.

In one embodiment, a secondary signal encryption mechanism of a secondary wireless communication device generates intermediary algorithmic outputs to two or more wireless communication devices, each implementing a primary signal encryption mechanism. As a consequence, multiple wireless communication devices may utilize the keys and ciphering algorithms provided by a single secondary signal encryption mechanism. It is contemplated that a secondary signal encryption mechanism is encoded with a unique key or identifier corresponding to a subscriber's account in which all services provided by a carrier will be billed to.

It is contemplated that a secondary signal encryption mechanism uniquely identifies a particular subscriber's billing account. By way of associating the secondary signal encryption mechanism to a single billing account, multiple wireless communication devices utilizing the same type of service may be billed to a single rate plan. As a result, a consumer of such services may be able to collectively consolidate multiple rate plans into a larger single plan. This may provide the consumer with a more cost effective rate plan. In addition, the charges for all services in all wireless communication devices may be presented in an easily managed single consolidated billing statement.

The secondary signal encryption mechanism may be implemented in modular form and may comprise a removable hardware and/or software capable of insertion into a wireless communication device. The hardware may comprise a memory capable of storing data related to the signal encryption process. In addition, the hardware may comprise a processor used in the processing of ciphering algorithms. In one embodiment, the removable hardware comprises a subscriber identity module (SIM) card used in wireless communication devices found in GSM networks.

Utilizing a common secondary signal encryption mechanism spanning one or more services over a plurality of wireless devices provides benefits to a consumer. By re-using a secondary signal encryption mechanism over multiple primary wireless communication devices, additional secondary signal encryption mechanisms are obviated, resulting in cost savings to the consumer.

In accordance with an embodiment of the invention, FIG. 1 is a block diagram of a system illustrating a multi-tier encryption process whereby a primary wireless communication device 104 encrypts a baseband signal (such as voice and data) by way of a signal encryption mechanism provided by a secondary wireless communication device 108. As illustrated, the primary wireless communication device 104 is in communication with the secondary wireless communication device 108. In this embodiment, the communication between the primary wireless communication device 104 and the secondary wireless communication device 108 is accomplished by way of an air interface 112. The air interface 112 may comprise a local area air interface or a wide area wireless air interface. The local area air interface 112 may be a Wi-Fi (802.11), Bluetooth, 27 Mhz, or 900 Mhz air interface, or the like. A wide area air interface 116 provides the telecommunications media by which the primary wireless communication device 104 communicates to a carrier's cell site (or base transceiver station) 120. The wide area air interface may comprise a GSM, GPRS, EDGE, WCDMA, UMTS, or 3G air interface, or the like. The wireless communication devices 104, 108 may be any wireless communication device including but not limited to cellular phones, personal digital assistants (PDA), wirelessly equipped Pocket PCs, laptops with wireless modems, wireless interactive digital electronic appliances, smart phones, and the like. The primary wireless communication device 104 may request one or more encrypted keys or algorithms used in encrypting the baseband signal transmitted to the carrier 120.

In one embodiment, the cell site 120 transmits a random number for signal encryption processing by the primary wireless communication device 104. After the random number is received, it is relayed to the secondary wireless communication device 108 where processing of the random number occurs. Processing at the secondary wireless communication device 104 incorporates the random number and one or more keys by applying one or more ciphering algorithms supplied by the encryption mechanism provided by the secondary wireless communication device 108. After processing is completed, the outcome is transported back to the primary wireless communication device 104, where it is incorporated into the primary signal encryption mechanism of the primary wireless communication device 104. The primary signal encryption mechanism encrypts the baseband signal transmitted to the cell site 120. It is contemplated that one or more wireless communication devices, each utilizing one or more services provided by a carrier, may be encrypted by the multi-tier signal encryption mechanism. The services may comprise wireless voice and/or wireless data. These services may be provided over GSM, GPRS, EDGE, 802.11, TDMA, FDMA, CDMA, UMTS, WCDMA, 3G, or like type of wireless networks.

One process by which the primary signal encryption mechanism receives an output from a secondary signal encryption mechanism is by way of a pairing mechanism between the primary and secondary wireless communication devices. The wireless communication devices are securely paired or coupled in order to facilitate a transmission of one or more outputs generated by one or more keys and/or algorithms of the secondary signal encryption mechanism resident in the secondary wireless communication device. In one embodiment, pairing may be accomplished over a wireless local area network connection such as that provided by an exemplary 802.11, Bluetooth, 27 Mhz, or 900 Mhz air interface. The connection may comprise a peer-to-peer type of connection. In one embodiment, pairing is accomplished when an input sequence such as a password is input into the primary wireless communication device after a wireless connection is established with the secondary wireless communication device. Input of the correct password initiates encryption processing performed by one or more ciphering algorithms contained within the secondary signal encryption mechanism of the secondary wireless communication device.

In one embodiment, a plurality of wireless devices may consecutively or simultaneously pair with a secondary wireless communication device containing a secondary signal encryption mechanism. In this fashion, each of the plurality of wireless devices may receive intermediary algorithmic outputs generated by the secondary signal encryption mechanism of the secondary wireless communication device.

In the embodiment shown in FIG. 1, an algorithmic output may be transmitted by way of a secondary signal encryption mechanism of a secondary wireless communication device 108 via an air interface 112 to a primary wireless communication device 104. In order to protect the data being transmitted over the air interface 112, it is contemplated that the air interface 112 provides a sufficient level of data transmission security. It is contemplated that the air interface 112 is designed to provide a level of security that equals or exceeds the security provided by any encryption performed by the secondary signal encryption mechanism of the secondary wireless communication device.

Figure 2:
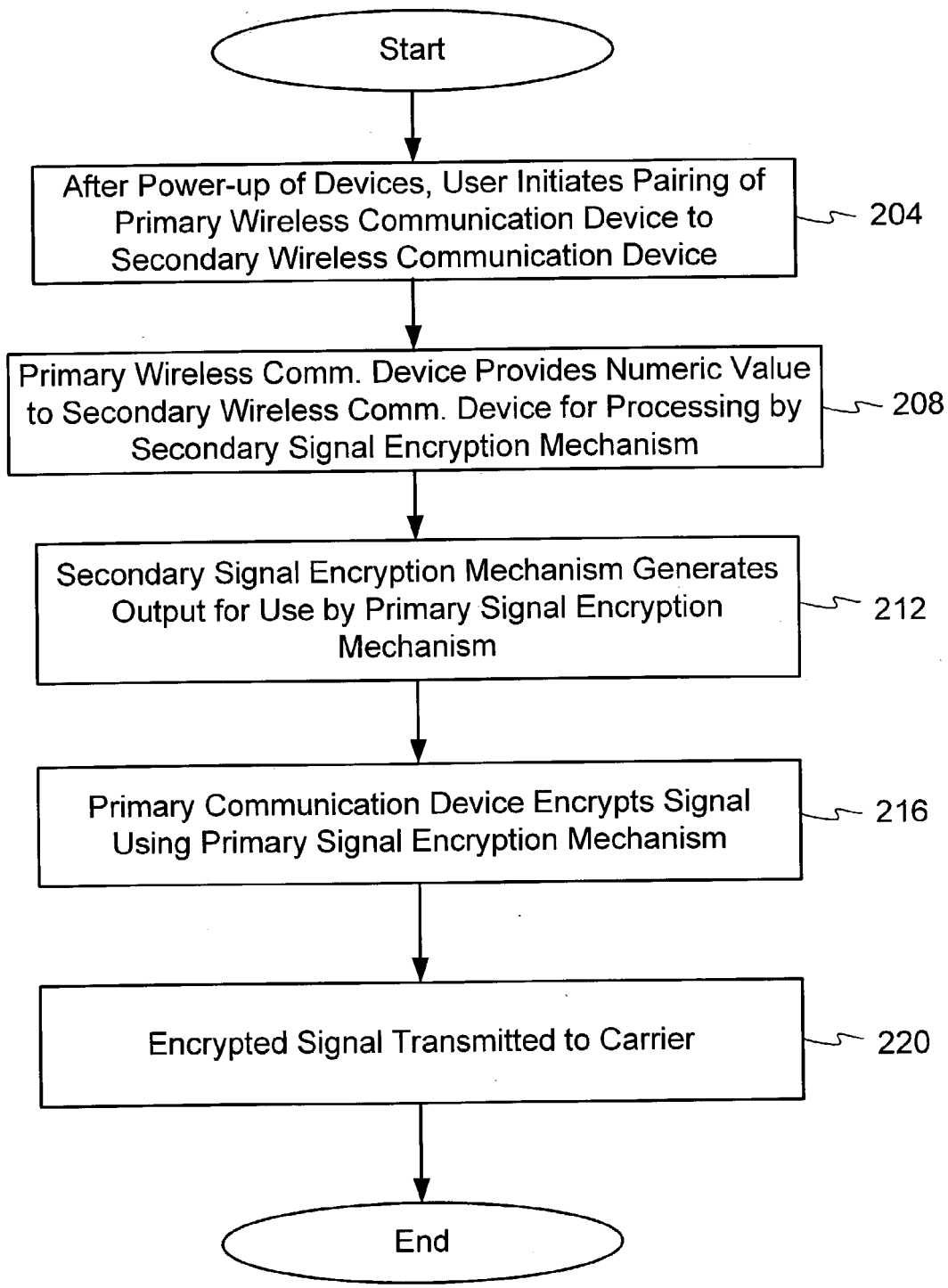
FIG. 2 is an operational flow diagram illustrating a multi-tier signal encryption mechanism in accordance with the system shown in FIG. 1, for example.

FIG. 2 illustrates an operational flow diagram of a multi-tier signal encryption process in accordance with the embodiment shown in FIG. 1, for example. At step 204, primary and secondary wireless communication devices are powered up and a user initiates pairing of a primary wireless communication device to a secondary wireless communication device. This may occur if the primary wireless communication device receives a sequence such as when the user inputs an exemplary personal identification number (PIN) by way of an exemplary keypad of the primary wireless communication device. The pairing process identifies the correct wireless communication device to pair with the primary wireless communication device and facilitates access to a secondary signal encryption mechanism of the paired device. At step 208, the primary wireless communication device relays a numeric value (such as a random number) provided by a carrier that is used in encryption processing. At step 212, the secondary signal encryption mechanism of the secondary wireless communication device generates an algorithmic output to be used by the primary signal encryption mechanism of the primary wireless communication device. The output is generated from one or more algorithms operating on one or more keys and/or numeric value(s). The algorithms and keys may be provided by the secondary signal encryption mechanism while the numeric value is provided by the carrier. At step 216, the primary wireless communication device encrypts the signal to be transmitted using one or more ciphering algorithms. At step 220, the encrypted signal is transmitted to the carrier. Although not illustrated in the system of FIG. 1, it is contemplated that a plurality of primary wireless communication devices may employ the multi-tier encryption process by incorporating outputs generated by a common single secondary signal encryption mechanism. It is contemplated that the outputs are uniquely generated based on the unique numeric value (or random number) supplied to the secondary signal encryption mechanism by the carrier. In one embodiment, step 204 is performed as an initialization step to facilitate an automatic pairing process. Automatic pairing facilitates access of the subscriber identification mechanism of the secondary wireless communication device without having to re-input the same PIN. It is contemplated that automatic pairing occurs when the primary wireless communication device is operated within communication range of the secondary wireless communication device. For example, step 204 is performed to initialize pairing of a newly provisioned primary wireless communication device to an existing secondary wireless communication device capable of providing a subscriber identification mechanism. After step 204 is initially performed, the wireless communication devices are paired automatically, for example, by way of a signal transmitted by the primary wireless communication device to the secondary wireless communication device. The signal may provide identifying information generated during the initialization step that is subsequently used in the automatic pairing process. The signal may be transmitted periodically through one or more air interfaces. As a result of this automatic pairing process, step 204 may not be required after pairing is initialized.

Figure 3:
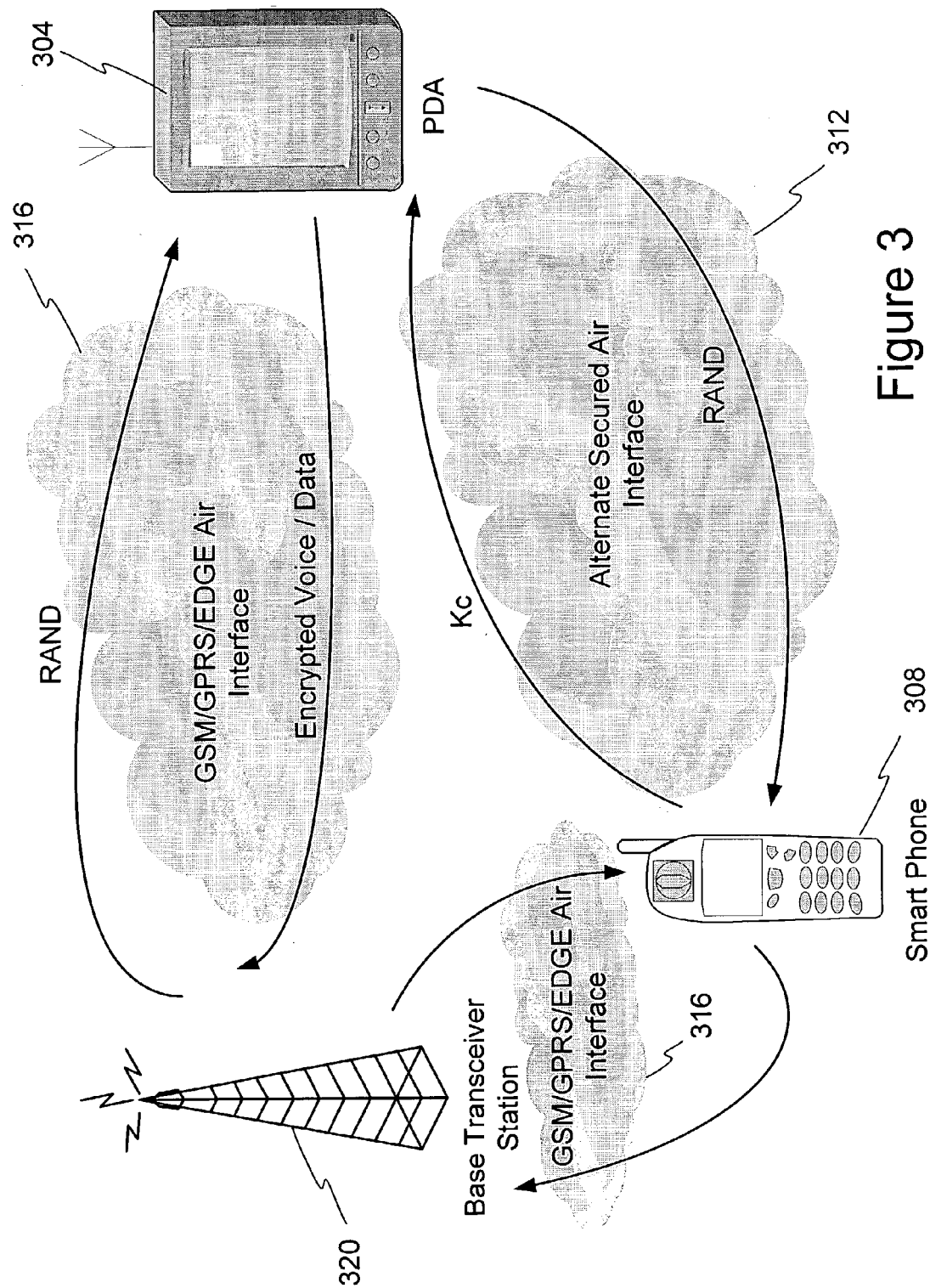
FIG. 3 is a block diagram of a system illustrating a multi-tier signal encryption mechanism over a GSM/GPRS/EDGE network in accordance with an embodiment of the invention.

FIG. 3 illustrates an embodiment of a system diagram in which a primary wireless communication device such as an exemplary PDA 304 communicates with a secondary wireless communication device such as a smart phone 308. As shown, the PDA 304 is capable of wireless communication over a wide area air interface such as an exemplary GSM/GPRS/EDGE air interface 316. In addition, the PDA 304 is capable of wireless communication over an alternate secured air interface 312 such as 802.11 or Bluetooth, for example. The alternate secured air interface may comprise an 802.11, Bluetooth, 27 Mhz, or 900 Mhz air interface or the like. The PDA 304 receives and transmits to a base transceiver station 320 of the GSM/GPRS/EDGE wireless network by way of the exemplary GSM/GPRS/EDGE air interface 316. The exemplary smart phone 308 communicates to the base transceiver station 320 over the GSM/GPRS/EDGE network. The smart phone 308 is configured to communicate with the PDA 304 over the alternate secured air interface 312 such as 802.11 or Bluetooth, for example. In the embodiment shown, the alternate secured air interface may comprise any local area air interface. It is contemplated the PDA 304 and smart phone 308 are configured to communicate over the GSM/GPRS/EDGE network as well as the alternate secured wireless interface 312 by way of appropriately configured wireless modems. In the encryption process, the base transceiver station 320 initiates the encryption process by transmitting a numeric value such as a random number (RAND) to the PDA 304. The random number is securely transmitted to the smart phone 308, by way of the PDA 304, for processing by an exemplary GSM A8 ciphering algorithm that incorporates one or more keys such as an exemplary GSM Ki key. It is contemplated that the A8 algorithm and Ki key is processed by hardware such as an exemplary GSM subscriber identity module (SIM) inserted within the smart phone 308. Processing by the A8 algorithm generates an output, such as an exemplary GSM Kc key, that is transmitted back to the primary wireless communication device 304. It is contemplated that Kc is stored in memory located within the primary wireless communication device for use by an exemplary GSM A5 ciphering algorithm provided by the primary signal encryption mechanism. It is contemplated that the A5 algorithm is processed by hardware inherent in the PDA. The processing provides secure encryption of the baseband signal prior to its transmission over the GSM/GPRS/EDGE air interface 316. In the exemplary system discussed, the PDA 304 and smart phone 308 may be any wireless communication device capable of transmitting over the GSM/GPRS/EDGE air interface and the alternate secured air interface.

Figure 4:
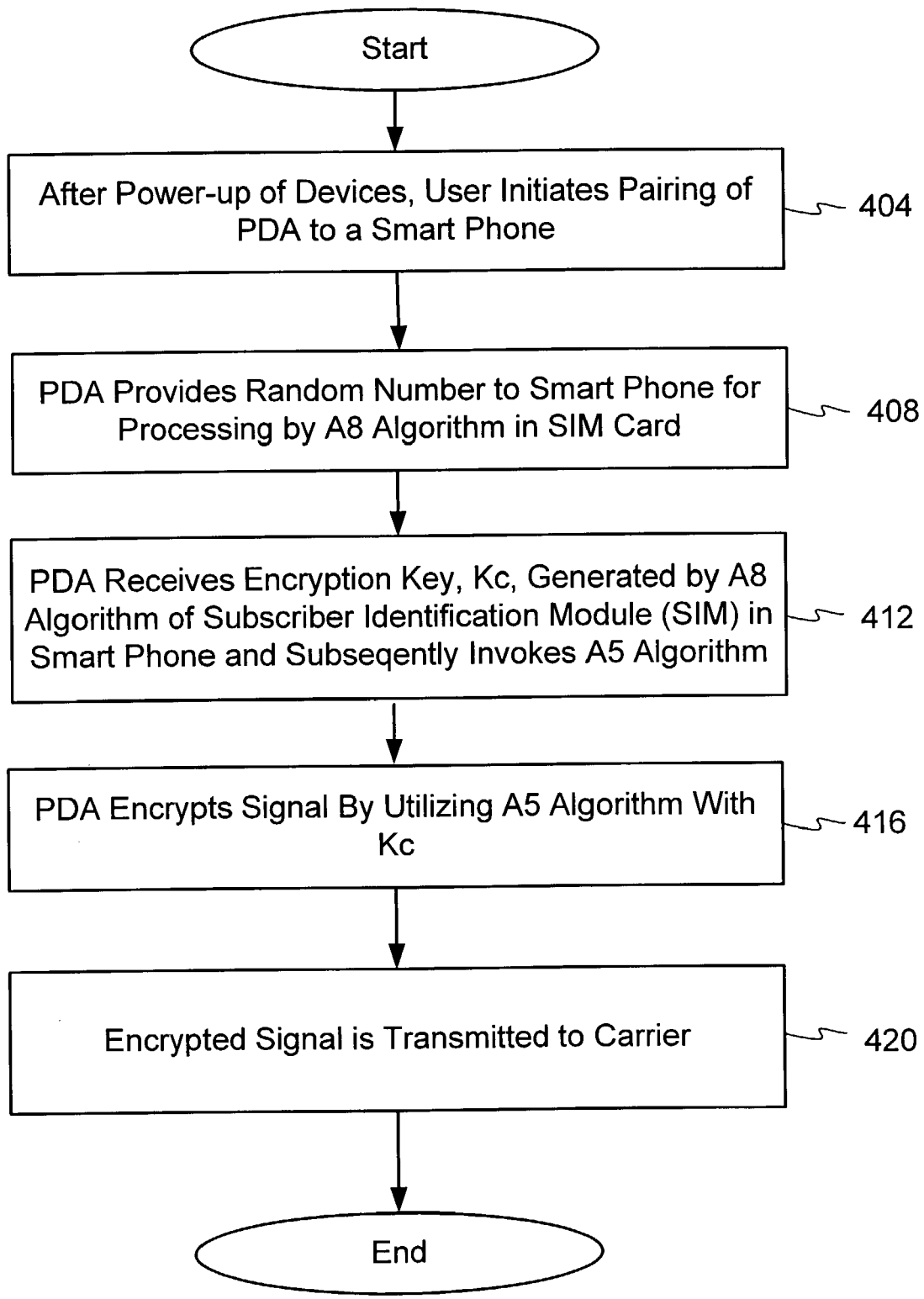
FIG. 4 is an operational flow diagram illustrating a multi-tier signal encryption mechanism over a GSM/GPRS/EDGE network in accordance with the system shown in FIG. 3, for example.

FIG. 4 is an operational flow diagram illustrating a multi-tier signal encryption process in accordance with the embodiment shown in FIG. 3, for example. At step 404, the exemplary PDA and exemplary smart phone are powered up and a user initiates pairing (as previously discussed) of the PDA to the smart phone. This may occur by inputting a personal identification number (PIN) on an input device of the PDA such as an exemplary touch pad, causing a wireless signal containing the PIN to be transmitted to the smart phone. The pairing process identifies the correct wireless communication device to pair with and facilitates the transmission of one or more outputs supplied by a secondary signal encryption mechanism of the paired device. At step 408, the PDA relays a numeric value such as a random number (RAND) provided by a carrier that is used in encryption processing at the secondary signal encryption mechanism. At step 412, a GSM A8 ciphering algorithm operates on a GSM Ki key and the random number (RAND). An algorithmic output such as a GSM Kc key is generated from the A8 algorithm operating on the Ki key and the random value (RAND). The A8 algorithm and Ki key is supplied by the SIM card while the random value (RAND) is provided by the carrier. The Kc key is securely transported back to the PDA for further processing by a GSM A5 ciphering algorithm. At step 416, the PDA encrypts a signal to be transmitted to carrier by utilizing the A5 algorithm with the Kc key. At step 420, the encrypted signal is transmitted to the carrier. Although not illustrated in the system of FIG. 3, it is contemplated that additional wireless communication devices may be encrypted in a similar fashion as performed on the PDA by way of the SIM card of the smart phone. In one embodiment, step 404 is performed as an initialization step to facilitate an automatic pairing process. Automatic pairing facilitates access of the subscriber identification mechanism of the smart phone without having to re-input the same PIN. It is contemplated that automatic pairing occurs when the PDA is operated within communication range of the smart phone. For example, step 404 is performed to initialize pairing of a newly provisioned PDA to an existing smart phone capable of providing a subscriber identification mechanism. After step 404 is initially performed, the wireless communication devices are paired automatically, for example, by way of a signal transmitted by the PDA to the smart phone. The signal may provide identifying information generated during the initialization step that is subsequently used in the automatic pairing process. The signal may be transmitted periodically through one or more air interfaces. As a result of this automatic pairing process, step 404 may not be required after pairing is initialized.

Figure 5:
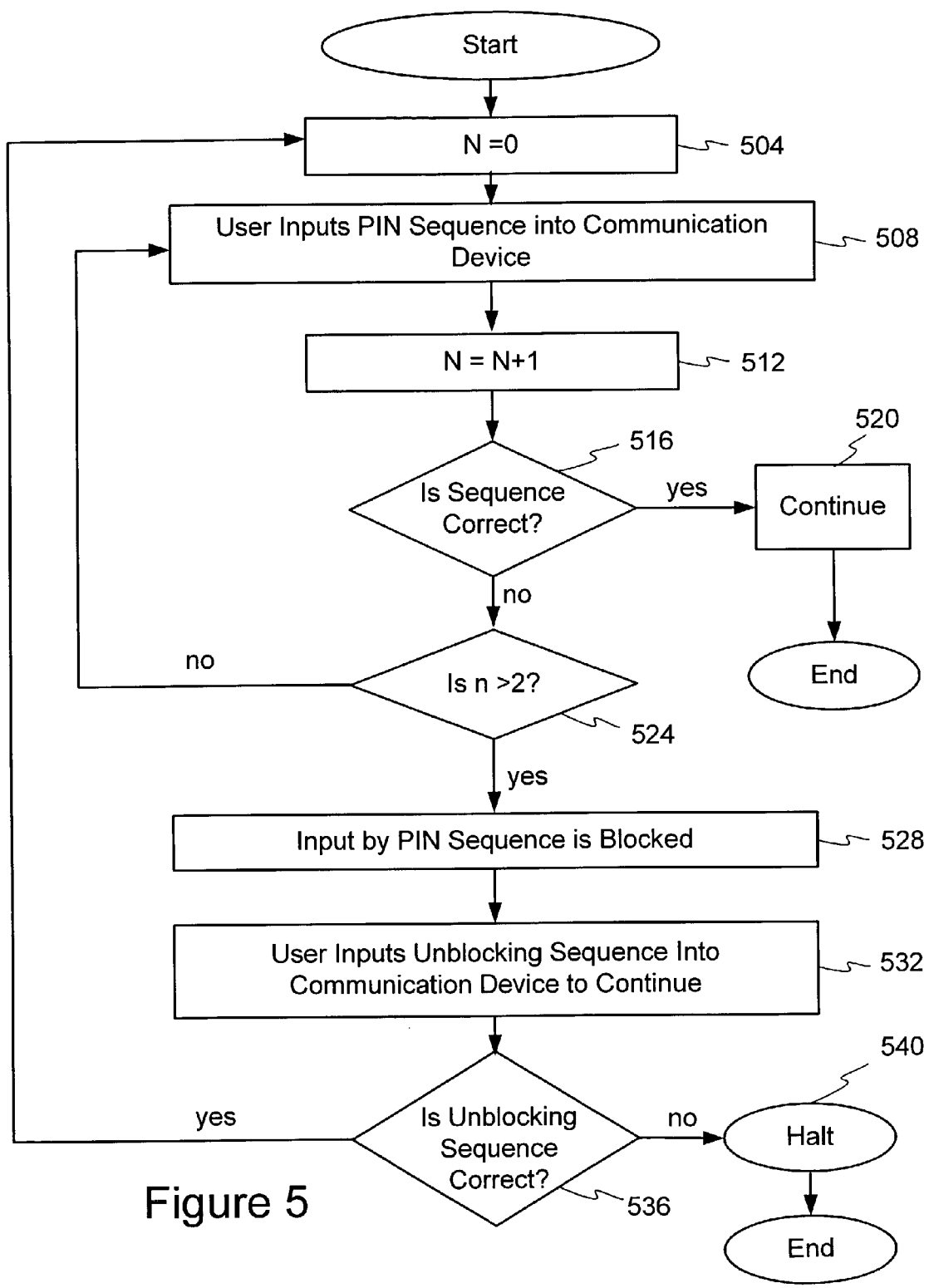
FIG. 5 is an operational flow diagram illustrating a method of pairing a primary wireless communication device to a secondary wireless communication device.

FIG. 5 illustrates an operational flow diagram describing in detail the pairing process of two wireless communication devices in accordance with an embodiment of the invention. The two wireless communication devices may comprise a primary wireless communication device and a secondary wireless communication device. The flow diagram illustrates an exemplary method for steps 204 and 404 of FIGS. 2 and 4, respectively. In this embodiment, a user is allowed no more than three attempts at inputting an exemplary four digit personal identification number (PIN) sequence. If the user inputs incorrectly a third time, a more sophisticated unblocking sequence is entered in order to continue entering a four digit PIN. At step 504, the primary wireless communication device tallies the number of attempts made by way of an attempts counter. The count is initialized by setting the count N equal to the value zero. At step 508, a user inputs a PIN sequence into the primary wireless communication device. At step 512, the counter is incremented by one to reflect the number of times a PIN has been consecutively entered. At step 516, a determination is made whether the PIN is correct by wirelessly transporting the PIN sequence to the secondary wireless communication device containing a secondary signal encryption mechanism such as a SIM card that verifies and validates the PIN sequence. In order for transmission to occur, it is contemplated that the wireless devices are positioned within an area supported by a carrier's wireless coverage area. If the correct PIN has been entered, pairing is successfully completed and the encryption process continues as indicated at step 520. If the PIN sequence entered is incorrect, the flow diagram proceeds to step 524, in which an evaluation of the number of input attempts is made. If the number of attempts equals the value three, the flow diagram proceeds to step 528, in which further attempts at entering the four digit PIN is blocked. At step 532, an unblocking sequence must be entered before additional attempts at entering the four digit PIN sequence is made. It is contemplated that the unblocking sequence is a more sophisticated sequence compared to that of the PIN. At step 536, if the user inputs the correct unblocking sequence, the process continues at step 504 and the attempts counter is reset to zero. Otherwise, the input attempt process halts at step 540. If the process is halted, it is contemplated that carrier intervention is required in order to reset the mechanism associated with the aforementioned pairing process.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of securely transmitting signals by a primary wireless communication device comprising:
   receiving a value from a wireless carrier;
   transmitting said value to a secondary wireless communication device;
   receiving a first output from said secondary wireless communication device, said first output generated using a first algorithm, said value and a key;
   applying a second algorithm using said first output to generate encrypted signals; and
   transmitting said encrypted signals to said wireless carrier.

2. The method of claim 1 wherein said first algorithm and said key is provided by a secondary signal encryption mechanism of said secondary wireless communication device.

3. The method of claim 1 wherein said second algorithm is provided by a primary signal encryption mechanism of said primary wireless communication device.

4. The method of claim 1 wherein said first algorithm is an A8 ciphering algorithm used in a GSM wireless system.

5. The method of claim 1 wherein said second algorithm is an A5 ciphering algorithm used in a GSM wireless system.

6. The method of claim 1 wherein said receiving said first output occurs by way of a secured air interface.

7. The method of claim 1 wherein said key comprises a Ki key of a GSM system.

8. The method of claim 1 wherein said transmitting said value to said secondary wireless communication device and said receiving said first output back by said primary wireless communication device occurs by way of local area air interface.

9. The method of claim 8 wherein said local area air interface comprises an 802.11, Bluetooth, 27 Mhz, or 900 Mhz air interface.

10. The method of claim 1 wherein said receiving said value by said primary wireless communication device and said transmitting said encrypted signals to said wireless carrier occurs by way of a wide area network air interface.

11. The method of claim 10 wherein said wide area network air interface comprises a GSM, GPRS, EDGE, UMTS, WCDMA, or 3G air interface.

12. The method of claim 1 wherein said value comprises a random number.

13. The method of claim 2 wherein said secondary signal encryption mechanism comprises a subscriber identity module (SIM) card.

14. The method of claim 1 further comprising:
   receiving an input sequence by said primary wireless communication device; and
   transmitting said input sequence to said secondary wireless communication device, said input sequence verified by said secondary wireless communication device, said secondary wireless communication device enabling access to a secondary signal encryption mechanism if said input sequence is correct.

15. The method of claim 14 wherein said sequence comprises a four digit number.

16. The method of claim 14 wherein said receiving an input sequence is performed to initialize automatic pairing of said primary wireless communication device to said secondary wireless communication device.

17. The method of claim 14 further comprising inputting an unblocking sequence to facilitate input of said four digit sequence.

18. The method of claim 2 wherein said secondary signal encryption mechanism uniquely identifies a subscriber's billing account.

19. A system for implementing secure signal transmission of a wireless communication device comprising:
   a first signal encryption mechanism associated with a first wireless communication device;
   a second signal encryption mechanism associated with a second wireless communication device;
   said second wireless communication device receiving a value originating from a wireless carrier, said second signal encryption mechanism generating a first output using said value and a key, said second wireless communication device transmitting said first output to said first wireless communication device, said first signal encryption mechanism generating encrypted signals using said first output and transmitting said encrypted signals to said wireless carrier.

20. The system of claim 19 wherein said first wireless communication device receives said value from said wireless carrier and transmits said value to said second wireless communication device.

21. The system of claim 19 wherein said first wireless communication device comprises a computer with one or more wireless modem cards or wireless PDA.

22. The system of claim 19 wherein said second wireless communication device comprises a cellular phone or smart phone capable of incorporating a signal encryption mechanism.

23. The system of claim 19 wherein said second signal encryption mechanism comprises a subscriber identity module (SIM) card.

24. The system of claim 19 wherein said second wireless communication device transmits said first output to said first wireless communication device over a local area air interface.

25. The system of claim 24 wherein said local area air interface comprises an 802.11, Bluetooth, 27 Mhz, or 900 Mhz air interface.

26. The system of claim 19 wherein said value comprises a random number.

27. The method of claim 1 wherein said encrypted signals comprises voice.

28. The method of claim 1 wherein said encrypted signals comprises data.

29. The method of claim 19 wherein said encrypted signals comprises voice.

30. The method of claim 19 wherein said encrypted signals comprises data.

31. A method for securely transmitting a signal comprising:
receiving an output from a second wireless communication device, said output generated by said second wireless communication device by first applying one or more first algorithms using a value generated from a wireless carrier;
using said output by a first wireless communication device by way of second applying one or more second algorithms to said output to generate an encrypted signal; and
transmitting said encrypted signal to said wireless carrier.

32. The method of claim 31 wherein said wireless carrier transmits said value to said second wireless communication device by way of said first wireless communication device.

33. The method of claim 31 wherein said one or more first algorithms further uses a key to generate said output, said key originating from said second wireless communication device.

34. The method of claim 33 wherein said key originates from a subscriber identity module (SIM) of said second wireless communication device.

35. The method of claim 31 wherein said signal is transmitted to said wireless carrier.

36. The method of claim 31 wherein said signal is authenticated at an authentication center of said wireless carrier.

37. The method of claim 31 wherein said signal comprises a baseband communication signal.

38. The method of claim 37 wherein said baseband communication signal comprises voice, data, and signaling information.

39. The method of claim 31 wherein said one or more first algorithms comprises an A8 ciphering algorithm used in a GSM wireless system.

40. The method of claim 31 wherein said one or more second algorithms comprises an A5 ciphering algorithm used in a GSM wireless system.

41. A method of wirelessly transmitting a signal using a multi-tier encryption process, said method comprising:
receiving a value from a wireless carrier by way of a second wireless communication device; and
applying one or more first algorithms to said value and to a key to generate an intermediary output;
processing said signal using said intermediary output by applying one or more second algorithms to generate an encrypted signal, said one or more first algorithms and said key resident in a first wireless communication device, said one or more second algorithms resident in said second wireless communication device; and
transmitting said encrypted signal to said wireless carrier.

42. The method of claim 41 wherein said signal comprises voice.

43. The method of claim 41 wherein said signal comprises data.

44. The method of claim 41 wherein said value comprises a random number.

45. The method of claim 41 wherein said key comprises a Ki key of a GSM system.

46. The method of claim 41 wherein said one or more first algorithms comprises an A8 ciphering algorithm used in a GSM wireless system.

47. The method of claim 41 wherein said one or more second algorithms comprises an A5 ciphering algorithm used in a GSM wireless system.

* * * * *